US008809454B2

(12) United States Patent
Arai et al.

(10) Patent No.: US 8,809,454 B2
(45) Date of Patent: Aug. 19, 2014

(54) PRESSURE-SENSITIVE ADHESIVE COMPOSITION AND PRESSURE-SENSITIVE ADHESIVE SHEET USING THE SAME

(75) Inventors: Takayuki Arai, Tokyo (JP); Mikihiro Kashio, Tokyo (JP); Toshikazu Takata, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/223,972

(22) PCT Filed: Feb. 21, 2007

(86) PCT No.: PCT/JP2007/053197
§ 371 (c)(1),
(2), (4) Date: Sep. 11, 2008

(87) PCT Pub. No.: WO2007/097365
PCT Pub. Date: Aug. 30, 2007

(65) Prior Publication Data
US 2009/0062467 A1    Mar. 5, 2009

(30) Foreign Application Priority Data
Feb. 23, 2006 (JP) .................................. 2006-046212

(51) Int. Cl.
C08G 63/48    (2006.01)

(52) U.S. Cl.
USPC ........................................................ 525/54.2

(58) Field of Classification Search
USPC ........................................................ 525/54.2
See application file for complete search history.

(56) References Cited

U.S. PATENT DOCUMENTS

| | | | | |
|---|---|---|---|---|
| 4,968,559 | A | * | 11/1990 | Kuroda et al. ............... 428/354 |
| 2005/0169975 | A1 | * | 8/2005 | Suzuki et al. ............... 424/448 |
| 2008/0097039 | A1 | * | 4/2008 | Ito et al. ..................... 525/384 |

FOREIGN PATENT DOCUMENTS

| | | |
|---|---|---|
| EP | 1 995 290 A1 | 11/2008 |
| JP | A-03-220120 | 9/1991 |
| JP | A-2003-049143 | 2/2003 |
| JP | 2003-268335 | 9/2003 |
| JP | A-2004-099792 | 4/2004 |
| JP | 2005-115028 | 4/2005 |
| JP | 2005-154689 | 6/2005 |
| JP | 2005-189437 | 7/2005 |
| WO | WO 01/83566 | 11/2001 |
| WO | WO 03/074099 | 9/2003 |
| WO | WO 2005/095493 | * 10/2005 |
| WO | WO 2006/088200 | 8/2006 |
| WO | WO 2006/090819 | 8/2006 |

OTHER PUBLICATIONS

PCT International Search Report mailed on Mar. 20, 2007 for the corresponding International patent application No. PCT/JP2007/053197.
Office Action mailed Oct. 26, 2011 issued from the Japan Patent Office in JP application No. 2006-046212.
Toyama, Mitsuo. "Pressure-sensitive Adhesive, Function and Mechanism Thereof." Japan, Kobunshi Kankokai 1$^{st}$ Edition (Feb. 20, 1991): pp. 13-14. (translation of relevant portion).
Efficient Production of Polyrotaxanes from α-Cyclodextrin and Poly(ethylene glycol) *Macromolecules*, vol. 38, No. 17 (2005): pp. 7524-7527.
Araki et al. "Polyrotaxane Derivatives, I. Preparation of Modified Polyrotaxanes with Nonionic Functional Groups and Their Solubility in Organic Solvents." *Journal of Polymer Science: Part A: Polymer Chemistry*, vol. 44 (2006): pp. 6312-6323.
Third Party Observations submitted to EPO in EP application No. 07714697.5 on Nov. 7, 2011.

* cited by examiner

*Primary Examiner* — Brandon Fetterolf
*Assistant Examiner* — Sonya Wright
(74) *Attorney, Agent, or Firm* — Posz Law Group, PLC

(57) ABSTRACT

A pressure-sensitive adhesive layer of pressure-sensitive adhesive sheet is formed by using: a pressure-sensitive adhesive composition comprising (A) a polyrotaxane having a linear-chain molecule passing through opening portions of at least two cyclic molecules, the cyclic molecules having a reactive group, the polyrotaxane having blocking groups at both ends of the linear-chain molecule, and (B) a pressure-sensitive adhesive polymer having two or more functional groups capable of reacting with the reactive group; or, a pressure-sensitive adhesive composition comprising (A) a polyrotaxane having a linear-chain molecule passing through opening portions of at least two cyclic molecules, the cyclic molecules having a reactive group, the polyrotaxane having blocking groups at both ends of the linear-chain molecule, (B') a pressure-sensitive adhesive polymer having two or more reactive groups, and (C) a compound having two or more functional groups capable of reacting with the reactive group of the polyrotaxane (A) and the reactive groups of the polymer (B'). As a result there can be provided a pressure-sensitive adhesive sheet comprising a pressure-sensitive adhesive layer excellent in flexibility and having high gel fraction and durability, and a pressure-sensitive adhesive composition that constitutes the pressure-sensitive adhesive layer.

27 Claims, 1 Drawing Sheet

PRESSURE-SENSITIVE ADHESIVE COMPOSITION AND PRESSURE-SENSITIVE ADHESIVE SHEET USING THE SAME

CROSS REFERENCE TO RELATED APPLICATIONS

This application is a U.S. national stage application of PCT/JP2007/053197 filed on Feb. 21, 2007, and claims priority to, and incorporates by reference, Japanese Patent Application No. 2006-046212 filed on Feb. 23, 2006.

TECHNICAL FIELD

The present invention relates to a pressure-sensitive adhesive sheet having a pressure-sensitive adhesive layer excellent in flexibility (stress relaxation properties), and to a pressure-sensitive adhesive composition that constitutes the pressure-sensitive adhesive layer.

BACKGROUND ART

In case of stress caused by dimensional changes of the substrate of a pressure-sensitive adhesive sheet, or of the adherend to which the pressure-sensitive adhesive sheet is stuck, a problem arises in that the pressure-sensitive adhesive sheet ends up peeling from the adherend over time. Such stress must be absorbed/relieved with a view to solving that problem. A conceivable solution herein involves increasing the flexibility of the pressure-sensitive adhesive layer.

Conventional methods for imparting flexibility to a pressure-sensitive adhesive include, for instance, using a base compound having a low glass transition temperature (Tg), adding a low molecular weight polymer having a low glass transition temperature (Tg), adding a plasticizer (liquid component), or reducing the content of cross-linking agent (Patent Documents 1 to 3)

[Patent document 1] Japanese Patent Application Laid-open No. 2003-49143

[Patent document 2] Japanese Patent Application Laid-open No. H03-220120

[Patent document 3] Japanese Patent Application Laid-open No. 2004-099792

DISCLOSURE OF THE INVENTION

Problem to be Solved by the Invention

Conventional pressure-sensitive adhesives, however, have all a low gel fraction, and exhibit durability problems in case of substantial stresses caused by the dimensional deformation of the substrate of the pressure-sensitive adhesive sheet, or of the adherend to which the pressure-sensitive adhesive sheet is stuck.

In light of the above, it is an object of the present invention to provide a pressure-sensitive adhesive sheet comprising a pressure-sensitive adhesive layer excellent in flexibility and having a high gel fraction and durability, and to provide a pressure-sensitive adhesive composition that constitutes the pressure-sensitive adhesive layer.

Means for Solving the Problem

To attain the above object, firstly, the present invention provides a pressure-sensitive adhesive composition comprising (A) a polyrotaxane having a linear-chain molecule passing through opening portions of at least two cyclic molecules, the cyclic molecules having a reactive group, the polyrotaxane having blocking groups at both ends of the linear-chain molecule; and (B) a pressure-sensitive adhesive polymer having two or more functional groups capable of reacting with the reactive group (Invention 1)

Also, secondly, the present invention provides a pressure-sensitive adhesive composition comprising (A) a polyrotaxane having a linear-chain molecule passing through opening portions of at least two cyclic molecules, the cyclic molecules having a reactive group, the polyrotaxane having blocking groups at both ends of the linear-chain molecule; (B') a pressure-sensitive adhesive polymer having two or more reactive groups, and (C) a compound having two or more functional groups capable of reacting with the reactive group of (A) and the reactive groups of (B') (Invention 2).

In the pressure-sensitive adhesive obtained using the pressure-sensitive adhesive compositions according to the above inventions (Inventions 1, 2), the cyclic molecules of the polyrotaxane are bonded to the pressure-sensitive adhesive polymer, and hence the pressure-sensitive adhesive exhibits excellent flexibility, since cyclic molecules can freely move along the linear-chain molecule of the polyrotaxane. The gel fraction of the pressure-sensitive adhesive can thus be increased, which affords as a result a pressure-sensitive adhesive having excellent durability.

In the above inventions (Inventions 1, 2), preferably, the reactive group is at least one selected from the group consisting of hydroxyl group, carboxyl group and amine group (Invention 3).

In the above inventions (Inventions 1, 2), preferably, the functional group is at least one selected from the group consisting of isocyanate group, epoxy group and aziridine group (Invention 4).

In the above inventions (Inventions 1 to 4), preferably, the weight-average molecular weight of the pressure-sensitive adhesive polymer is 1,000 to 2,000,000 (Invention 5).

In the above inventions (Inventions 1 to 5), preferably, the glass transition temperature (Tg) of the pressure-sensitive adhesive polymer is not higher than 50° C. (Invention 6).

In the above inventions (Inventions 1 to 6), preferably, the cyclic molecule of the polyrotaxane is at least one selected from the group consisting of a cyclic polyether, a cyclic polyester, a cyclic polyether amine and a cyclic polyamine (Invention 7), or at least one selected from the group consisting of α-cyclodextrin, β-cyclodextrin and γ-cyclodextrin (Invention 8).

In the above inventions (Inventions 1 to 8), preferably, the polyrotaxane comprises, as the cyclic molecule, a cyclodextrin having introduced therein a polymer chain and/or a substituent (Invention 9). In such an invention, the solubility of the polyrotaxane and the compatibility thereof with the above pressure-sensitive adhesive polymer can be enhanced by selecting the polymer chain or the substituent.

In the above inventions (Inventions 1 to 9), preferably, the linear-chain molecule of the polyrotaxane is at least one selected from the group consisting of polyethylene glycol, polypropylene glycol, polyisoprene, polyisobutylene, polybutadiene, polytetrahydrofuran, polyacrylates, polydimethylsiloxane, polyethylene and polypropylene (Invention 10).

In the above inventions (Inventions 1 to 10), preferably, the number-average molecular weight of the linear-chain molecule of the polyrotaxane is 3,000 to 300,000 (Invention 11).

In the above inventions (Inventions 1 to 11), preferably, the blocking groups of the polyrotaxane are at least one selected from the group consisting of dinitrophenyl groups, cyclodextrins, adamantane groups, trityl groups, fluoresceins, pyrenes and anthracenes (Invention 12), or the block groups of the polyrotaxane are a main chain or side chain of a polymer having a number-average molecular weight of 1,000 to 1,000,000 (Invention 13).

In the above invention (Invention 1), preferably, the cyclic molecules of the polyrotaxane are α-cyclodextrin, the linear-chain molecule of the polyrotaxane is polyethylene glycol, the blocking groups of the polyrotaxane are adamantane groups, and the pressure-sensitive adhesive polymer is a polyacrylate copolymer (Invention 14).

Thirdly, the present invention (Invention 15) provides a pressure-sensitive adhesive sheet, comprising a pressure-sensitive adhesive layer formed using the pressure-sensitive adhesive composition according to anyone of the above inventions (Inventions 1 to 14).

The gel fraction of the pressure-sensitive adhesive layer of the pressure-sensitive adhesive sheet according to the above invention (Invention 15) is preferably not less than 70% (Invention 16).

In the pressure-sensitive adhesive sheet according to the above inventions (Inventions 15 to 16), the holding power of the pressure-sensitive adhesive sheet, in accordance with JIS Z0237, is preferably not less than 100 μm, as the displacement of the pressure-sensitive adhesive sheet after 70,000 seconds (Invention 17).

Advantageous Effect of the Invention

The present invention allows thus obtaining a pressure-sensitive adhesive sheet comprising a pressure-sensitive adhesive layer which is excellent in flexibility and has a high gel fraction and durability, and to provide a pressure-sensitive adhesive composition that constitutes the pressure-sensitive adhesive layer.

BEST MODE FOR CARRYING OUT THE INVENTION

Embodiments of the present invention are explained below.

A pressure-sensitive adhesive composition according to an embodiment of the present invention is a pressure-sensitive adhesive composition (1) comprising (A) a polyrotaxane having a linear-chain molecule passing through opening portions of at least two cyclic molecules, the cyclic molecules having a reactive group, the polyrotaxane having blocking groups at both ends of the linear-chain molecule, and (B) a pressure-sensitive adhesive polymer having two or more functional groups capable of reacting with the reactive group. A pressure-sensitive adhesive layer can be obtained using the pressure-sensitive adhesive composition (1), through direct bonding of the cyclic molecules of the polyrotaxane with the pressure-sensitive adhesive polymer.

A pressure-sensitive adhesive composition according to another embodiment of the present invention is a pressure-sensitive adhesive composition (2) comprising (A) a polyrotaxane having a linear-chain molecule passing through opening portions of at least two cyclic molecules, the cyclic molecules having a reactive group, the polyrotaxane having blocking groups at both ends of the linear-chain molecule, (B') a pressure-sensitive adhesive polymer having two or more reactive groups, and (C) a compound having two or more functional groups capable of reacting with the reactive group of (A) and the reactive groups of (B'). A pressure-sensitive adhesive layer can be obtained using the pressure-sensitive adhesive composition (2), through indirect bonding of the cyclic molecules of the polyrotaxane and the pressure-sensitive adhesive polymer via the compound.

Figure 1:
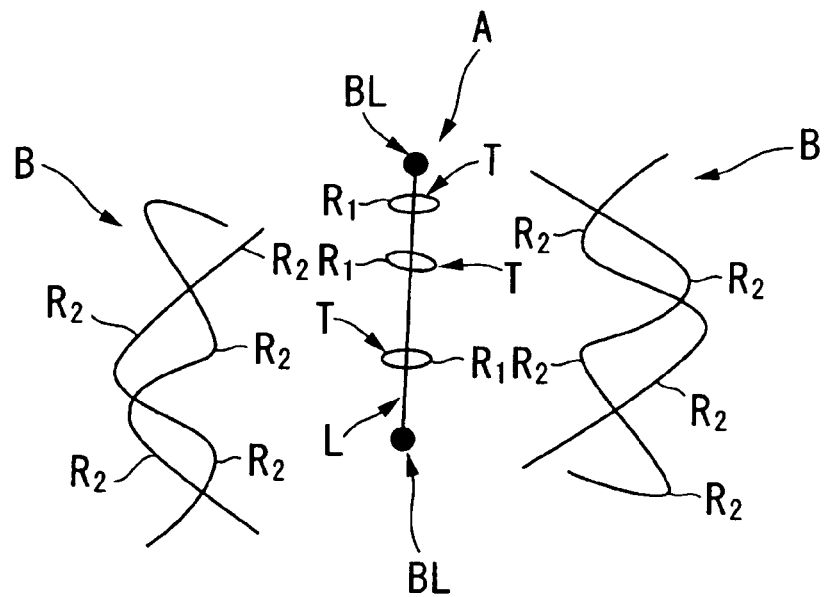
FIG. 1 is a conceptual diagram showing a pressure-sensitive adhesive composition according to an embodiment of the present invention.

As shown in FIG. 1, the pressure-sensitive adhesive composition (1) can be obtained by blending a polyrotaxane (component (A)) having a linear-chain molecule L passing through opening portions of at least two cyclic molecules T that have a reactive group $R_1$, the polyrotaxane having blocking groups BL at both ends of the linear-chain molecule L, and a pressure-sensitive adhesive polymer (component (B)) having two or more functional groups $R_2$ capable of reacting with the reactive group $R_1$, of the polyrotaxane.

Figure 2:
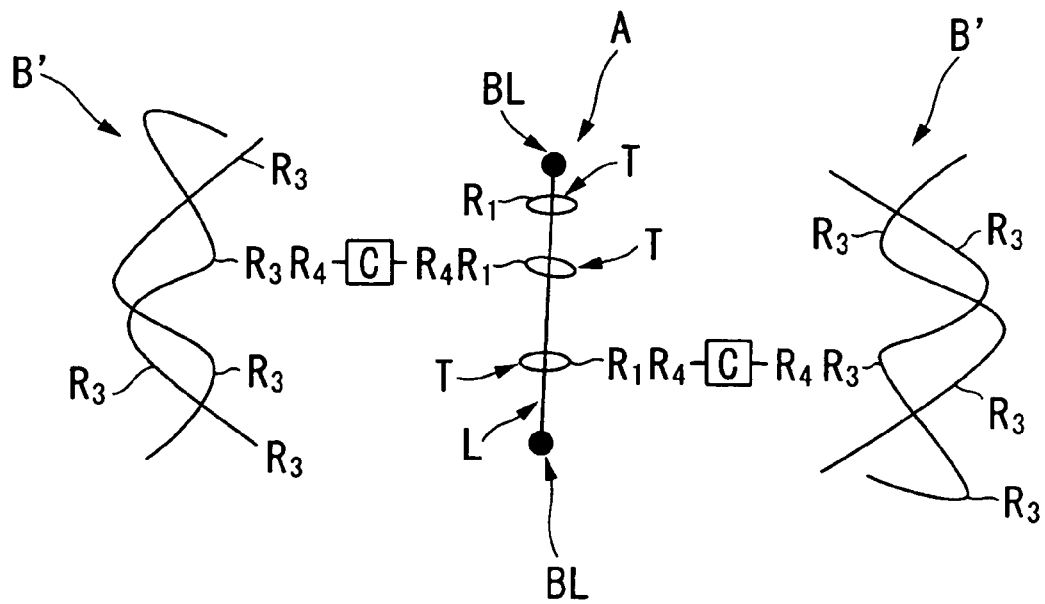
FIG. 2 is a conceptual diagram showing a pressure-sensitive adhesive composition according to another embodiment of the present invention.

As shown in FIG. 2, the pressure-sensitive adhesive composition (2) can be obtained by blending a polyrotaxane (component (A)) having a linear-chain molecule L passing through opening portions of at least two cyclic molecules T that have a reactive group $R_1$, the polyrotaxane having blocking groups BL at both ends of the linear-chain molecule L, a pressure-sensitive adhesive polymer (component (B')) having two or more reactive groups $R_3$, and a bi- or higher functional compound (component (C)) having a plurality of functional groups $R_4$ capable of reacting with the reactive group $R_1$, and the reactive groups $R_3$.

The component (A) can be obtained in accordance with known methods (for instance, the method described in Japanese Patent Application Laid-open No. 2005-154675).

The linear-chain molecule L of the component (A) is not particularly limited, provided that it is a molecule or a substance which is included in the cyclic molecules T, which can yield an integrated body through mechanical bonds, not chemical bonds such as covalent bonds or the like, and which is a linear chain. In the description of the present invention, the "linear-chain" in "linear chain molecule" means essentially "linear". That is, the linear-chain molecule L may have a branched chain, provided that the cyclic molecules T can move along the linear-chain molecule L.

Preferred examples of the linear-chain molecule L of the component (A) include, for instance, polyethylene glycol, polypropylene glycol, polyisoprene, polyisobutylene, polybutadiene, polytetrahydrofuran, polyacrylates, polydimethylsiloxane, polyethylene, polypropylene or the like. The pressure-sensitive adhesive composition may comprise two or more types of such linear-chain molecules L.

The number-average molecular weight of the linear-chain molecule L of the component (A) is preferably 3,000 to 300,000, in particular 10,000 to 200,000, and more preferably 20,000 to 100,000. When the number-average molecular weight is smaller than 3,000, the moving range of the cyclic molecules T along the linear-chain molecule L is short, which may preclude obtaining a pressure-sensitive adhesive having sufficient flexibility. A number-average molecular weight exceeding 300,000 may impair the solubility of the component (A) in solvents, or the compatibility of the component (A) with the component (B) or the component (B')

The cyclic molecules T of the component (A) are not particularly limited, provided that they can form an inclusion complex with the linear-chain molecule L, and can move along the linear-chain molecule L. In the present invention, "cyclic" in "cyclic molecule" means essentially "cyclic". That is, provided that the cyclic molecules T can move along the linear-chain molecule L, the cyclic molecules T need not be a completely closed ring, and may exhibit, for instance, a spiral structure.

Preferable examples of the cyclic molecule T of the component (A) include, for instance, cyclic polymers such as a cyclic polyether, a cyclic polyester, a cyclic polyether amine, a cyclic polyamine or the like, or, cyclodextrins such as α-cyclodextrin, β-cyclodextrin, γ-cyclodextrin or the like. The component (A) or the pressure-sensitive adhesive composition may comprise two or more types of such cyclic molecules T.

Specific examples of cyclic polymers include, for instance, crown ethers or derivatives thereof, calixarenes or derivatives thereof, cyclophanes or derivatives thereof, and cryptands or derivatives thereof.

Polymer chains and/or substituents capable of enhancing the solubility of the component (A) may also be introduced in the above cyclodextrins. Examples of such polymer chains include, for instance, oxyethylene chains, alkyl chains, acrylate chains or the like. The number-average molecular weight of the polymer chain is preferably 100 to 10,000, in particular 400 to 2,000.

Examples of the above substituents include, for instance, acetyl groups, alkyl groups, trityl groups, tosyl groups, trimethylsilane groups and phenyl groups.

The introduction rate (degree of substitution) of the above polymer chains or substituents in the hydroxyl groups of the cyclodextrin is preferably 10 to 90%, in particular 30 to 70%. An introduction rate less than 10% may preclude enhancing sufficiently the solubility of the component (A), while an introduction rate exceeding 90% results in a lower content of reactive groups $R_1$ in the component (A), which may preclude the component (A) from reacting sufficiently with the component (B) or the component (C).

The reactive group $R_1$ of the cyclic molecules T of the component (A) is preferably, for instance, hydroxyl group, carboxyl group, amine group or the like. The component (A) may comprise two or more types of the reactive group $R_1$.

The introduction rate of reactive groups $R_1$ in the cyclic molecules T is preferably 4 to 90%, in particular 20 to 70%. An introduction rate less than 4% may preclude the component (A) from reacting sufficiently with the component (B) or the component (C) On the other hand, sufficient flexibility may fail to be ensured in the pressure-sensitive adhesive when the introduction rate exceeds 90%.

The blocking groups BL of the component (A) are not particularly limited provided that they are groups that can keep the cyclic molecules T skewered by the linear-chain molecule L. Examples of such groups include, for instance, bulky groups, ionic groups or the like.

Specific examples of the blocking groups BL of the component (A) preferably include, for instance, dinitrophenyl groups, cyclodextrins, adamantane groups, trityl groups, fluoresceins, pyrenes, anthracenes or the like, or, a main chain, side chain or the like of a polymer having a number-average molecular weight of 1,000 to 1,000,000. The component (A) or the pressure-sensitive adhesive composition may comprise two or more types of such blocking groups BL.

Examples of the above polymers having a number-average molecular weight of 1,000 to 1,000,000 include, for instance, polyamides, polyimides, polyurethanes, polydimethylsiloxanes, polyacrylates or the like.

The amount of component (A) used in the pressure-sensitive adhesive composition (1) (or (2)) is appropriately selected so as to obtain a pressure-sensitive adhesive having good flexibility, adhesive strength, holding power and the like, and is ordinarily selected to range from 1 to 50 parts by weight, preferably 5 to 35 parts by weight, relative to 100 parts by weight of component (B) (or component (B')).

The component (B) in the pressure-sensitive adhesive composition (1), and the component (B') in the pressure-sensitive adhesive composition (2) are not particularly limited provided that they allow achieving a desired adhesiveness, and may be, for instance, a polyurethane, a polydimethylsiloxane, a polyacrylate or the like.

The weight-average molecular weight of the component (B) and the component (B') is preferably 1,000 to 2,000,000, in particular 100,000 to 1,500,000, and more preferably 300,000 to 1,200,000. A weight-average molecular weight less than 1,000 may result in a pressure-sensitive adhesive having insufficient flexibility and durability. A weight-average molecular weight exceeding 2,000,000, on the other hand, may impair compatibility with the component (A) and may preclude ensuring sufficient flexibility in the pressure-sensitive adhesive.

Preferably, the glass transition temperature (Tg) of the component (B) and the component (B') is not higher than 50° C., in particular not higher than 30° C. A glass transition temperature (Tg) higher than 50° C. may impair compatibility with the component (A) and may preclude bringing out sufficient flexibility in the pressure-sensitive adhesive.

The functional groups $R_2$ in the component (B) are preferably, for instance, isocyanate groups, epoxy groups, aziridine groups or the like. The pressure-sensitive adhesive polymer may comprise two or more types of such functional groups $R_2$. The reactive groups $R_3$ in the component (B') are preferably, for instance, hydroxyl groups, carboxyl groups, amine groups or the like. The component (B') may comprise two or more types of such reactive groups $R_3$.

The introduction rate of functional groups $R_2$ in the component (B), or the introduction rate of the reactive groups $R_3$ in the component (B'), is preferably 0.5 to 50%, in particular 5 to 25%. An introduction rate less than 0.5% may preclude the component (B) or the component (B') from reacting sufficiently with the component (A) or the component (C). On the other hand, an introduction rate exceeding 50% may promote gelling of the component (B) or the component (B'), and may preclude bringing out sufficient flexibility in the pressure-sensitive adhesive.

The component (C) is not particularly limited, provided that it is a bi- or higher functional compound capable of reacting with the reactive groups $R_1$ and the reactive groups $R_3$. The functional groups $R_4$ in the component (C) are preferably, for instance, isocyanate groups, epoxy groups, aziridine groups or the like. The component (C) may comprise two or more types of functional groups $R_4$.

Examples of the component (C) include, for instance, isocyanate compounds such as xylylene diisocyanate, hexamethylene diisocyanate, tolylene diisocyanate, isophorone diisocyanate or the like; epoxy compounds such as ethylene glycol diglycidyl ether, propylene glycol diglycidyl ether, 1,6-hexanediol glycidyl ether or the like; or aziridine compounds such as N,N-hexamethylene-1,6-bis(1-aziridine carboxyamide) or the like.

The amount of component (C) used in the pressure-sensitive adhesive composition (2) is appropriately selected depending on the type of the component (C), in such a manner so as to obtain a pressure-sensitive adhesive having good adhesive strength, holding power and the like, and is ordinarily selected to range from 0.001 to 30 parts by weight, preferably 0.01 to 20 parts by weight, relative to 100 parts by weight of component (B').

The most preferable pressure-sensitive adhesive composition (1) is a composition obtained by blending a component (A) in which the cyclic molecules T are α-cyclodextrins having hydroxyl groups as reactive groups, the linear-chain molecule L is polyethylene glycol, and the blocking groups BL are adamantane groups, with a component (B) of an acrylate copolymer having isocyanate groups as functional groups.

The most preferable pressure-sensitive adhesive composition (2) is a composition obtained by blending a component (A) in which the cyclic molecules T are α-cyclodextrins having hydroxyl groups as reactive groups, the linear-chain molecule L is polyethylene glycol, and the blocking groups BL are adamantane groups, with a component (B') of an acrylate copolymer having hydroxyl groups as functional groups, and a component (C) of an isocyanate compound.

The pressure-sensitive adhesive compositions (1), (2) thus obtained can form a pressure-sensitive adhesive layer through heat curing at a temperature of about 80° C. to 150° C.

In the pressure-sensitive adhesive obtained using the above pressure-sensitive adhesive compositions (1), (2), the cyclic molecules T of the component (A) are directly or indirectly bonded with the component (B) or component (B') (the component (B) or component (B') being cross-linked by way of the component (A)). As a result, the pressure-sensitive adhesive exhibits excellent flexibility, since the cyclic molecules T can move freely along the linear-chain molecule L of the component (A).

A pressure-sensitive adhesive sheet of the present invention is explained next. The pressure-sensitive adhesive sheet according to an embodiment of the present invention comprises a pressure-sensitive adhesive layer formed using the above-described pressure-sensitive adhesive compositions (1), (2), and having optionally also a substrate sheet as a support. The pressure-sensitive adhesive sheet may also have optionally a release sheet.

The substrate sheet that is used is not particularly limited, and may be any substrate sheet employed in ordinary pressure-sensitive adhesive sheets. Examples thereof, include, for instance, woven or nonwoven fabrics using fibers such as rayon, acrylic or polyester fibers; paper such as woodfree paper, glassine paper, impregnated paper, coated paper or the like; metal foil of aluminum, copper or the like; foams such as urethane foams, polyethylene foams or the like; polyester films such as polyethylene terephthalate, polybutylene terephthalate, polyethylene naphthalate or the like; plastic films such as polyurethane films, polyethylene films, polypropylene films, polyvinylchloride films, polyvinylidene chloride films, polyvinyl alcohol films, ethylene-vinyl acetate copolymer films, polystyrene films, polycarbonate films, acrylic resin films, norbornene resin films, cycloolefin resin films or the like; as well as laminates of two or more of the foregoing. The plastic films may be uniaxially or biaxially stretched.

To form the pressure-sensitive adhesive layer on the substrate sheet, the pressure-sensitive adhesive layer may be provided by directly applying a solution comprising the pressure-sensitive adhesive composition (1), (2) onto the substrate sheet. Alternatively, the pressure-sensitive adhesive layer may be provided by applying a solution comprising the pressure-sensitive adhesive composition (1), (2) onto a release sheet, followed by superposing onto the substrate sheet, thereby transferring the pressure-sensitive adhesive layer to the substrate sheet. The method used for applying a solution comprising the pressure-sensitive adhesive composition (1), (2) can be a conventionally known method, such as roll coating, knife coating, bar coating, gravure coating, die coating, spray coating or the like. The pressure-sensitive adhesive layer can be formed by applying a solution comprising the pressure-sensitive adhesive composition (1), (2), in accordance with the above methods, followed by solvent removal by way of, for instance, hot-air drying or the like, and reaction and cross-linking of the pressure-sensitive adhesive composition (1), (2) through heating or the like. The thickness of the pressure-sensitive adhesive layer is not particularly limited, and ranges ordinarily from 5 to 100 μm, preferably from 10 to 60 μm, in accordance with the intended application.

The release sheet used may be, for instance, paper such as glassine paper, clay coated paper, kraft paper, woodfree paper or the like, or a laminated paper of the foregoing with a polyethylene resin or the like. The release sheet may also be a release sheet in which a release agent such as a fluororesin, a silicone resin or the like is applied onto a plastic film of polyethylene terephthalate, a polyolefin or the like, followed by thermal curing, UV curing or the like to form a release layer.

The gel fraction of the pressure-sensitive adhesive layer formed using the pressure-sensitive adhesive composition (1), (2) is preferably not less than 70%, and in particular not less than 80%. The gel fraction of the pressure-sensitive adhesive obtained using the pressure-sensitive adhesive composition (1), (2) can thus be increased, which affords as a result a pressure-sensitive adhesive having excellent durability. Normally, a higher gel fraction implies less flexibility. The pressure-sensitive adhesive obtained using the pressure-sensitive adhesive composition (1), (2), however, is excellent in flexibility in spite of a high gel fraction.

As regards the degree of flexibility, the holding power of a pressure-sensitive adhesive sheet obtained by applying the pressure-sensitive adhesive composition (1), (2) onto a substrate is such that results in a displacement of the pressure-sensitive adhesive sheet of preferably not less than 100 μm, in particular not less than 200 μm, after 70,000 seconds in accordance with JIS Z0237.

In the pressure-sensitive adhesive sheet having the pressure-sensitive adhesive layer formed using the pressure-sensitive adhesive composition of the present invention, the pressure-sensitive adhesive layer can absorb and/or relieve thus the stress resulting from dimensional changes of the substrate of the pressure-sensitive adhesive sheet or of the adherend to which the pressure-sensitive adhesive sheet is stuck, even when such dimensional change is substantial. The pressure-sensitive adhesive sheet becomes thus unlikelier to peel off the adherend, even over long periods of time.

EXAMPLES

Following is a more detailed description of the present invention through examples and so on; however, the scope of the present invention is not limited by those examples and so on.

Synthesis Example (1) Synthesis of the Component (A)

<Preparation of the Linear-Chain Molecule L>

In 100 ml of water there were dissolved 10 g of polyethylene glycol (PEG) (made by Sigma-Aldrich Corporation, number-average molecular weight Mn: 35,000), 100 mg of 2,2,6,6-tetramethyl-1-piperidinyloxy radical (TEMPO) and 1 g of sodium bromide. To the obtained solution there were added 5 ml of a commercially available aqueous solution of sodium hypochlorite (available chlorine concentration of about 5%), and then the reaction was left to proceed under stirring at room temperature. Herein, 1N NaOH was added so as to keep the pH at 10 to 11. The reaction was terminated through addition of ethanol.

The obtained reaction solution was extracted thrice with 50 ml of methylene chloride, to extract the component other than inorganic salts. The methylene chloride was distilled off then in an evaporator. The extract was dissolved in 250 ml of warm ethanol, and was left to stand overnight at a temperature below −4° C., to precipitate the PEG-carboxylic acid alone. The precipitated PEG-carboxylic acid was recovered by centrifugation. This cycle of dissolution in warm ethanol-precipitation-centrifugation was repeated several times, followed lastly by vacuum drying, to yield a dry PEG-carboxylic acid. The yield was not less than 95% and the carboxylation rate of the PEG was not less than 95%.

<Preparation of the Inclusion Complex of the Linear-Chain Molecule L and the Cyclic Molecules T>

Respective solutions were obtained by dissolving 3 g of the PEG-carboxylic acid thus prepared in 50 ml of warm water at 70° C., and 12 g of α-cyclodextrin (by Nacalai Tesque, Inc.) in 50 ml of warm water at 70° C. The two solutions were then mixed and the resulting mixture was left to stand overnight at 4° C. The cream-like inclusion complex that precipitated was freeze-dried and recovered. The yield was not less than 90%.

<Attachment of the Blocking Groups BL to the Inclusion Complex of the Linear-Chain Molecule L and the Cyclic Molecules T>

A solution of 0.13 g of adamantanamine (made by Sigma-Aldrich Corporation) dissolved in 50 ml of dimethylformamide (DMF) at room temperature was added to 14 g of the obtained inclusion complex, immediately followed by thorough shaking. Next, a solution of 0.38 g of BOP reagent (benzotriazole-1-yl-oxy-tris-(dimethylamino)-phosphonium hexafluorophosphate) dissolved with 25 ml of DMF was then added to the solution, also with thorough shaking. To the resulting solution there was further added a solution of 0.14 ml of diisopropylethylamine dissolved with 25 ml of DMF, also with thorough shaking. The obtained mixture was left to stand overnight in a refrigerator.

Thereafter, 100 ml of a mixed solution of DMF/methanol=1:1 was added to the above mixture, with thorough mixing followed by centrifugation, discarding the supernatant. Such washing with a mixed solution of DMF/methanol was repeated twice, after which the same centrifugation washing was repeated twice using 100 ml of methanol. The obtained precipitate was vacuum-dried and was dissolved in 50 ml of dimethyl sulfoxide (DMSO). The obtained transparent solution was dropped into 700 ml of water to precipitate the polyrotaxane. The precipitated polyrotaxane was recovered by centrifugation and was vacuum-dried or freeze-dried. This cycle of dissolution in DMSO—precipitation in water—drying was repeated twice, to yield eventually the purified polyrotaxane. The yield was about 68%, on the basis of the added inclusion complex. The obtained polyrotaxane is denoted as polyrotaxane (a) (cyclic molecules T: α-cyclodextrin, linear-chain molecule L: PEG, blocking groups BL: adamantane groups).

The hydroxyl groups of the α-cyclodextrin of the polyrotaxane (a) were acetylated with acetic anhydride in a dimethylacetamide/lithium chloride solvent, in the presence of dimethylaminopyridine (catalyst). The obtained polyrotaxane is denoted as polyrotaxane (b).

The hydroxyl group at one terminus of polyethylene glycol 600 (made by Sigma-Aldrich Corporation, Mn: 600) was tosylated through reaction with tosyl chloride in methylene chloride, in the presence of pyridine (catalyst). Meanwhile, the hydroxyl groups of the cyclodextrins of the polyrotaxane (a) were activated with sodium hydride in dimethylformamide, and were then made to react with the above tosylated polyethylene glycol, to form ether bonds, adding thereby long oxyethylene chains to the hydroxyl groups of the cyclodextrins. The obtained polyrotaxane is denoted as polyrotaxane (c).

(2) Synthesis of the Component (B) and the Component (B')

In 200 parts by weight of ethyl acetate there were mixed 90 parts by weight of n-butyl acrylate, 10 parts by weight of 2-isocyanate ethyl methacrylate, and 0.6 parts by weight of azobisisobutyronitrile as a polymerization initiator, with stirring at 60° C. for 17 hours, to yield a polyacrylate copolymer solution (solids concentration of 33.5 wt %) having a weight-average molecular weight of 410,000. The polyacrylate copolymer is denoted as polyacrylate copolymer (I) (component (B)).

Also, 80 parts by weight of n-butyl acrylate, 20 parts by weight of 2-hydroxyethyl acrylate, and 0.4 parts by weight of azobisisobutyronitrile as a polymerization initiator, were mixed in a mixed solvent of 300 parts by weight of ethyl acetate there and 100 parts by weight of methyl ethyl ketone, with stirring at 60° C. for 17 hours, to yield a polyacrylate copolymer solution (solids concentration of 20.0 wt %) having a weight-average molecular weight of 800,000. The polyacrylate copolymer is denoted as polyacrylate copolymer (II) (component (B')).

Example 1

A pressure-sensitive adhesive composition (A) was obtained by mixing 20 parts by weight of the polyrotaxane (a) and 100 parts by weight (solids basis) of the polyacrylate copolymer (I), followed by dilution with methyl ethyl ketone so as to yield a solution having a solids concentration of 20%.

Example 2

A pressure-sensitive adhesive composition (B) was obtained by mixing 20 parts by weight of the polyrotaxane (b) and 100 parts by weight (solids basis) of the polyacrylate copolymer (I), followed by dilution with methyl ethyl ketone so as to yield a solution having a solids concentration of 20%.

Example 3

A pressure-sensitive adhesive composition (C) was obtained by mixing 20 parts by weight of the polyrotaxane (c) and 100 parts by weight (solids basis) of the polyacrylate copolymer (I), followed by dilution with methyl ethyl ketone so as to yield a solution having a solids concentration of 20%.

Example 4

A pressure-sensitive adhesive composition (D) was obtained by mixing 20 parts by weight of the polyrotaxane (a), 100 parts by weight (solids basis) of the polyacrylate copolymer (II), and 10 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Example 5

A pressure-sensitive adhesive composition (E) was obtained by mixing 30 parts by weight of the polyrotaxane (a), 100 parts by weight (solids basis) of the polyacrylate copolymer (II), and 15 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Example 6

A pressure-sensitive adhesive composition (F) was obtained by mixing 5 parts by weight of the polyrotaxane (b), 100 parts by weight (solids basis) of the polyacrylate copolymer (II), and 2.5 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Example 7

A pressure-sensitive adhesive composition (G) was obtained by mixing 20 parts by weight of the polyrotaxane (b), 100 parts by weight (solids basis) of the polyacrylate copolymer (II), and 10 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Example 8

A pressure-sensitive adhesive composition (H) was obtained by mixing 20 parts by weight of the polyrotaxane (c), 100 parts by weight (solids basis) of the polyacrylate copolymer (II), and 10 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Comparative Example 1

A pressure-sensitive adhesive composition (I) was obtained by mixing 100 parts by weight (solids basis) of the polyacrylate copolymer (II), and 10 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Comparative Example 2

A pressure-sensitive adhesive composition (J) was obtained by mixing 100 parts by weight (solids basis) of the polyacrylate copolymer (II), and 0.1 parts by weight (solids basis) of a xylylene diisocyanate trifunctional adduct (made by Soken Chemical & Engineering Co., Ltd., TD-75), followed by dilution with methyl ethyl ketone so as to yield a solution having a solids concentration of 20%.

Comparative Example 3

A pressure-sensitive adhesive composition (K) was obtained by mixing 20 parts by weight of the polyrotaxane (a) and 100 parts by weight (solids basis) of the polyacrylate copolymer (II), followed by dilution with methyl ethyl ketone so as to yield a solution having a solids concentration of 20%.

The polyrotaxane (a) and the polyacrylate copolymer (II) do not react with each other, as they have no reactive groups/functional groups that can react with one another.

Test Example (1) Measurement of the Holding Power

The pressure-sensitive adhesive compositions (A) through (K) were applied such that the thickness after drying would be 20 μm onto the release treated surface of a polyethylene terephthalate release sheet (made by LINTEC, SP-PET3811) obtained by subjecting one surface to release treatment with a silicone type release agent, and heating was carried out for 1 minute at 100° C., to form pressure-sensitive adhesive layers. The pressure-sensitive adhesive layers and an easily-adhesive type polyethylene terephthalate sheet (made by Toyobo Co., Ltd., PET50A4300, thickness: 50 μm) were superposed onto each other, to obtain pressure-sensitive adhesive sheets.

The amount of displacement (μm) after 70,000 seconds of the pressure-sensitive adhesive sheets was measured in accordance with the method for measuring holding power of JIS Z0237. The results are shown in Table 1.

(2) Measurement of the Gel Fraction

The pressure-sensitive adhesive compositions (A) through (K) were applied such that the thickness after drying would be 20 μm onto the release treated surface of a polyethylene terephthalate release sheet (made by LINTEC, SP-PET3811) obtained by subjecting one surface to release treatment with a silicone type release agent, and heating was carried out for 1 minute at 100° C., to form pressure-sensitive adhesive layers. The pressure-sensitive adhesive layers were superposed onto the release-treated surface of another polyethylene terephthalate release sheet (made by LINTEC, SP-PET3801), to obtain pressure-sensitive adhesive sheets.

The pressure-sensitive adhesive sheets were left to stand for one week under an atmosphere at 23° C. and 50% humidity, after which about 0.1 g of the pressure-sensitive adhesive was sampled from the pressure-sensitive adhesive sheets and was wrapped in a Tetron mesh (#400). The non-gel fraction of the pressure-sensitive adhesive was then extracted under reflux with ethyl acetate as a solvent in a Soxhlet extractor (lipid extractor, by Tokyo Glass Kikai Co.). The gel fraction was calculated based on the ratio vis-à-vis the initial weight. The results are shown in Table 1.

(3) Durability Test

The pressure-sensitive adhesive compositions (A) through (K) were applied such that the thickness after drying would be 20 μm onto the release treated surface of a polyethylene terephthalate release sheet (made by LINTEC, SP-PET3811) obtained by subjecting one surface to release treatment with a silicone type release agent, and heating was carried out for 1 minute at 100° C., to form pressure-sensitive adhesive layers. The pressure-sensitive adhesive layers and a uniaxially stretched polyethylene terephthalate sheet (made by Toyobo Co., Ltd., thickness: 38 μm) were superposed onto each other, to obtain pressure-sensitive adhesive sheets.

The pressure-sensitive adhesive sheets were cut into 50 mm×50 mm specimens, the specimens from which the release sheet was peeled off were stuck onto a glass plate. After being left to stand for 300 hours under a dry atmosphere at 80° C., the appearance of the specimens was inspected visually and the occurrence of lifting/peeling was assessed.

The results are shown in Table 1. In Table 1, "O" denotes no lifting/peeling and "x" denotes lifting/peeling.

TABLE 1

| | Pressure-sensitive adhesive composition | Holding power (amount of displacement, μm) | Gel fraction (%) | Durability |
|---|---|---|---|---|
| Example 1 | A | 210 | 85 | o |
| Example 2 | B | 230 | 82 | o |
| Example 3 | C | 260 | 80 | o |
| Example 4 | D | 320 | 94 | o |
| Example 5 | E | 410 | 96 | o |
| Example 6 | F | 150 | 92 | o |
| Example 7 | G | 370 | 91 | o |
| Example 8 | H | 390 | 90 | o |
| Comparative example 1 | I | 30 | 97 | x |
| Comparative example 2 | J | 320 | 64 | x |
| Comparative example 3 | K | — | 0 | x |

As can be seen from Table 1, the pressure-sensitive adhesive sheets having the pressure-sensitive adhesive layers obtained from the pressure-sensitive adhesive compositions (A) through (H) of Examples 1 through 8 exhibited a large displacement (not less than 100 μm) in the holding power test, as well as a gel fraction not less than 70% and excellent durability.

INDUSTRIAL APPLICABILITY

The present invention is useful as a pressure-sensitive adhesive sheet having a pressure-sensitive adhesive layer excellent in flexibility (stress relaxation properties), and which is used in case of substantial stresses caused by the dimensional changes of the substrate of the pressure-sensitive adhesive sheet, or of the adherend to which the pressure-sensitive adhesive sheet is stuck. The present invention is also useful as a pressure-sensitive adhesive composition that constitutes the pressure-sensitive adhesive layer of the pressure-sensitive adhesive sheet.

The invention claimed is:

1. A pressure-sensitive adhesive sheet, comprising:
a support sheet selected from the group consisting of a substrate sheet and a release sheet, and
   a pressure-sensitive adhesive layer formed on the support sheet using a pressure-sensitive adhesive composition, comprising:
   (A) a polyrotaxane having a linear-chain molecule passing through opening portions of at least two cyclic molecules, said cyclic molecules having a reactive group, said polyrotaxane having blocking groups at both ends of said linear-chain molecule; and
   (B) a pressure-sensitive adhesive polymer having two or more functional groups capable of reacting with said reactive group,
   wherein the pressure-sensitive adhesive polymer (B) is a polyacrylate, and the weight-average molecular weight of the polyacrylate is 100,000 to 2,000,000,
   said reactive group is at least one selected from the group consisting of hydroxyl group, carboxyl group and amine group,
   the glass transition temperature (Tg) of said pressure-sensitive adhesive polymer is not higher than 50° C., and
   the pressure-sensitive adhesive sheet has a holding power defined by applying the pressure-sensitive adhesive sheet onto another substrate, the pressure sensitive adhesive composition being held on the substrate for 70,000 seconds after displacement of the pressure sensitive sheet of not less than 100 μm in accordance with JIS Z0237.

2. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule;
(B') a pressure-sensitive adhesive polymer having two or more reactive groups, and
(C) a compound having two or more functional groups capable of reacting with the reactive group of said (A) and the reactive groups of said (B'),
wherein the pressure-sensitive adhesive polymer (B') is a polyacrylate, and the weight-average molecular weight of the polyacrylate is 100,000 to 2,000,000,
said functional group is at least one selected from the group consisting of isocyanate group, epoxy group and aziridine group,
the glass transition temperature (Tg) of said pressure-sensitive adhesive polymer is not higher than 50° C., and
the pressure-sensitive adhesive sheet has a holding power defined by applying the pressure-sensitive adhesive sheet onto another substrate, the pressure sensitive adhesive composition being held on the substrate for 70,000 seconds after displacement of the pressure sensitive sheet of not less than 100 μm in accordance with JIS Z0237.

3. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule;
(B') a pressure-sensitive adhesive polymer having two or more reactive groups, and
(C) a compound having two or more functional groups capable of reacting with the reactive group of said (A) and the reactive groups of said (B'),
wherein the pressure-sensitive adhesive polymer (B') is a polyacrylate, and the weight-average molecular weight of the polyacrylate is 100,000 to 2,000,000,
said reactive group is at least one selected from the group consisting of hydroxyl group, carboxyl group and amine group,
the glass transition temperature (Tg) of said pressure-sensitive adhesive polymer is not higher than 50° C., and
the pressure-sensitive adhesive sheet has a holding power defined by applying the pressure-sensitive adhesive sheet onto another substrate, the pressure sensitive adhesive composition being held on the substrate for 70,000 seconds after displacement of the pressure sensitive sheet of not less than 100 μm in accordance with JIS Z0237.

4. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule; and
(B) a pressure-sensitive adhesive polymer having two or more functional groups capable of reacting with said reactive group,
wherein the pressure-sensitive adhesive polymer (B) is a polyacrylate, and the weight-average molecular weight of the polyacrylate is 100,000 to 2,000,000,
said functional group is at least one selected from the group consisting of isocyanate group, epoxy group and aziridine group,
the glass transition temperature (Tg) of said pressure-sensitive adhesive polymer is not higher than 50° C., and
the pressure-sensitive adhesive sheet has a holding power defined by applying the pressure-sensitive adhesive sheet onto another substrate, the pressure sensitive adhesive composition being held on the substrate for 70,000 seconds after displacement of the pressure sensitive sheet of not less than 100 μm in accordance with JIS Z0237.

5. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule; and
(B) a pressure-sensitive adhesive polymer having two or more functional groups capable of reacting with said reactive group,
wherein the pressure-sensitive adhesive polymer (B) is a polyacrylate, and the weight-average molecular weight of the polyacrylate is 100,000 to 2,000,000,
the introduction rate of the functional groups in the pressure-sensitive adhesive polymer (B) is 0.5 to 50%,
the glass transition temperature (Tg) of said pressure-sensitive adhesive polymer is not higher than 50° C., and
the pressure-sensitive adhesive sheet has a holding power defined by applying the pressure-sensitive adhesive sheet onto another substrate, the pressure sensitive adhesive composition being held on the substrate for 70,000 seconds after displacement of the pressure sensitive sheet of not less than 100 μm in accordance with JIS Z0237.

6. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule; and
(B) a pressure-sensitive adhesive polymer having two or more functional groups capable of reacting with said reactive group,
wherein the pressure-sensitive adhesive polymer (B) is a polyacrylate, and the weight-average molecular weight of the polyacrylate is 100,000 to 2,000,000,
said reactive group is at least one selected from the group consisting of hydroxyl group, carboxyl group and amine group,
the glass transition temperature (Tg) of said pressure-sensitive adhesive polymer is not higher than 50° C., and
the pressure-sensitive adhesive sheet has a durability that is determined by cutting the pressure-sensitive adhesive sheet into 50 mm by 50 mm specimens, removing the release sheet and adhering the specimens onto a glass plate, maintaining the specimens adhered to the glass plate in a dry atmosphere at 80° C. for 300 hours, inspecting a visual appearance of the specimens and observing no occurrence of lifting and/or peeling of the specimens from the glass plate.

7. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule;
(B') a pressure-sensitive adhesive polymer having two or more reactive groups, and
(C) a compound having two or more functional groups capable of reacting with the reactive group of said (A) and the reactive groups of said (B'),
wherein the pressure-sensitive adhesive polymer (B') is a polyacrylate, and the weight-average molecular weight of the polyacrylate is 100,000 to 2,000,000,
said functional group is at least one selected from the group consisting of isocyanate group, epoxy group and aziridine group,
the glass transition temperature (Tg) of said pressure-sensitive adhesive polymer is not higher than 50° C., and
the pressure-sensitive adhesive sheet has a durability that is determined by cutting the pressure-sensitive adhesive sheet into 50 mm by 50 mm specimens, removing the release sheet and adhering the specimens onto a glass plate, maintaining the specimens adhered to the glass plate in a dry atmosphere at 80° C. for 300 hours, inspecting a visual appearance of the specimens and observing no occurrence of lifting and/or peeling of the specimens from the glass plate.

8. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule;

(B') a pressure-sensitive adhesive polymer having two or more reactive groups, and
(C) a compound having two or more functional groups capable of reacting with the reactive group of said (A) and the reactive groups of said (B'),
wherein the pressure-sensitive adhesive polymer (B') is a polyacrylate, and the weight-average molecular weight of the polyacrylate is 100,000 to 2,000,000,
said reactive group is at least one selected from the group consisting of hydroxyl group, carboxyl group and amine group,
the glass transition temperature (Tg) of said pressure-sensitive adhesive polymer is not higher than 50° C., and
the pressure-sensitive adhesive sheet has a durability that is determined by cutting the pressure-sensitive adhesive sheet into 50 mm by 50 mm specimens, removing the release sheet and adhering the specimens onto a glass plate, maintaining the specimens adhered to the glass plate in a dry atmosphere at 80° C. for 300 hours, inspecting a visual appearance of the specimens and observing no occurrence of lifting and/or peeling of the specimens from the glass plate.

9. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule; and
(B) a pressure-sensitive adhesive polymer having two or more functional groups capable of reacting with said reactive group,
wherein the pressure-sensitive adhesive polymer (B) is a polyacrylate, and the weight-average molecular weight of the polyacrylate is 100,000 to 2,000,000,
said functional group is at least one selected from the group consisting of isocyanate group, epoxy group and aziridine group,
the glass transition temperature (Tg) of said pressure-sensitive adhesive polymer is not higher than 50° C., and
the pressure-sensitive adhesive sheet has a durability that is determined by cutting the pressure-sensitive adhesive sheet into 50 mm by 50 mm specimens, removing the release sheet and adhering the specimens onto a glass plate, maintaining the specimens adhered to the glass plate in a dry atmosphere at 80° C. for 300 hours, inspecting a visual appearance of the specimens and observing no occurrence of lifting and/or peeling of the specimens from the glass plate.

10. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule; and
(B) a pressure-sensitive adhesive polymer having two or more functional groups capable of reacting with said reactive group,
wherein the pressure-sensitive adhesive polymer (B) is a polyacrylate, and the weight-average molecular weight of the polyacrylate is 100,000 to 2,000,000,
the introduction rate of the functional groups in the pressure-sensitive adhesive polymer (B) is 0.5 to 50%,
the glass transition temperature (Tg) of said pressure-sensitive adhesive polymer is not higher than 50° C., and
the pressure-sensitive adhesive sheet has a durability that is determined by cutting the pressure-sensitive adhesive sheet into 50 mm by 50 mm specimens, removing the release sheet and adhering the specimens onto a glass plate, maintaining the specimens adhered to the glass plate in a dry atmosphere at 80° C. for 300 hours, inspecting a visual appearance of the specimens and observing no occurrence of lifting and/or peeling of the specimens from the glass plate.

11. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule; and
(B) a pressure-sensitive adhesive polymer having two or more functional groups capable of reacting with said reactive group,
wherein the pressure-sensitive adhesive polymer (B) is a polyacrylate, and the weight-average molecular weight of the polyacrylate is 100,000 to 2,000,000,
said reactive group is at least one selected from the group consisting of hydroxyl group, carboxyl group and amine group,
the glass transition temperature (Tg) of said pressure-sensitive adhesive polymer is not higher than 50° C., and
the pressure-sensitive adhesive sheet has an adhering strength that absorbs and/or relieves stress resulting from a measurable dimensional change of the at least one of the substrate of the pressure-sensitive adhesive sheet or an adherend to which the pressure-sensitive adhesive sheet is adhered, thereby reducing peeling.

12. A pressure-sensitive adhesive sheet, comprising:
a support sheet selected from the group consisting of a substrate sheet and a release sheet, and
a pressure-sensitive adhesive layer formed on the support sheet using a pressure-sensitive adhesive composition, comprising:
(A) a polyrotaxane having a linear-chain molecule passing through opening portions of at least two cyclic molecules, said cyclic molecules having a reactive group, said polyrotaxane having blocking groups at both ends of said linear-chain molecule;
(B') a pressure-sensitive adhesive polymer having two or more reactive groups, and
(C) a compound having two or more functional groups capable of reacting with the reactive group of said (A) and the reactive groups of said (B'),
wherein the pressure-sensitive adhesive polymer (B') is a polyacrylate, and the weight-average molecular weight of the polyacrylate is 100,000 to 2,000,000,
said functional group is at least one selected from the group consisting of isocyanate group, epoxy group and aziridine group, the glass transition temperature (Tg) of said pressure-sensitive adhesive polymer is not higher than 50° C., and the pressure-sensitive adhesive sheet has an adhering strength that absorbs and/or relieves stress resulting from a measurable dimensional change of the at least one of the substrate of the pressure-sensitive adhesive sheet or an adherend to which the pressure-sensitive adhesive sheet is adhered, thereby reducing peeling.

13. A pressure-sensitive adhesive sheet, comprising:

a support sheet selected from the group consisting of a substrate sheet and a release sheet, and a pressure-sensitive adhesive layer formed on the support sheet using a pressure-sensitive adhesive composition, comprising:

(A) a polyrotaxane having a linear-chain molecule passing through opening portions of at least two cyclic molecules, said cyclic molecules having a reactive group, said polyrotaxane having blocking groups at both ends of said linear-chain molecule;

(B') a pressure-sensitive adhesive polymer having two or more reactive groups, and (C) a compound having two or more functional groups capable of reacting with the reactive group of said (A) and the reactive groups of said (B'), wherein the pressure-sensitive adhesive polymer (B') is a polyacrylate, and the weight-average molecular weight of the polyacrylate is 100,000 to 2,000,000, said reactive group is at least one selected from the group consisting of hydroxyl group, carboxyl group and amine group, the glass transition temperature (Tg) of said pressure-sensitive adhesive polymer is not higher than 50° C., and the pressure-sensitive adhesive sheet has an adhering strength that absorbs and/or relieves stress resulting from a measurable dimensional change of the at least one of the substrate of the pressure-sensitive adhesive sheet or an adherend to which the pressure-sensitive adhesive sheet is adhered, thereby reducing peeling.

14. A pressure-sensitive adhesive sheet, comprising:

a support sheet selected from the group consisting of a substrate sheet and a release sheet, and a pressure-sensitive adhesive layer formed on the support sheet using a pressure-sensitive adhesive composition, comprising:

(A) a polyrotaxane having a linear-chain molecule passing through opening portions of at least two cyclic molecules, said cyclic molecules having a reactive group, said polyrotaxane having blocking groups at both ends of said linear-chain molecule; and (B) a pressure-sensitive adhesive polymer having two or more functional groups capable of reacting with said reactive group, wherein the pressure-sensitive adhesive polymer (B) is a polyacrylate, and the weight-average molecular weight of the polyacrylate is 100,000 to 2,000,000, said functional group is at least one selected from the group consisting of isocyanate group, epoxy group and aziridine group, the glass transition temperature (Tg) of said pressure-sensitive adhesive polymer is not higher than 50° C., and the pressure-sensitive adhesive sheet has an adhering strength that absorbs and/or relieves stress resulting from a measurable dimensional change of the at least one of the substrate of the pressure-sensitive adhesive sheet or an adherend to which the pressure-sensitive adhesive sheet is adhered, thereby reducing peeling.

15. A pressure-sensitive adhesive sheet, comprising:

a support sheet selected from the group consisting of a substrate sheet and a release sheet, and a pressure-sensitive adhesive layer formed on the support sheet using a pressure-sensitive adhesive composition, comprising:

(A) a polyrotaxane having a linear-chain molecule passing through opening portions of at least two cyclic molecules, said cyclic molecules having a reactive group, said polyrotaxane having blocking groups at both ends of said linear-chain molecule; and (B) a pressure-sensitive adhesive polymer having two or more functional groups capable of reacting with said reactive group, wherein the pressure-sensitive adhesive polymer (B) is a polyacrylate, and the weight-average molecular weight of the polyacrylate is 100,000 to 2,000,000, the introduction rate of the functional groups in the pressure-sensitive adhesive polymer (B) is 0.5 to 50%, the glass transition temperature (Tg) of said pressure-sensitive adhesive polymer is not higher than 50° C., and the pressure-sensitive adhesive sheet has an adhering strength that absorbs and/or relieves stress resulting from a measurable dimensional change of the at least one of the substrate of the pressure-sensitive adhesive sheet or an adherend to which the pressure-sensitive adhesive sheet is adhered, thereby reducing peeling.

16. The pressure-sensitive adhesive sheet according to any of claims 1 to 5, wherein said cyclic molecules of said polyrotaxane is at least one selected from the group consisting of a cyclic polyether, a cyclic polyester, a cyclic polyether amine and a cyclic polyamine.

17. The pressure-sensitive adhesive sheet according to any of claims 1 to 5, wherein said cyclic molecules of said polyrotaxane is at least one selected from the group consisting of α-cyclodextrin, β-cyclodextrin and γ-cyclodextrin.

18. The pressure-sensitive adhesive sheet according to any of claims 1 to 5, wherein said polyrotaxane comprises, as said cyclic molecules, a cyclodextrin having introduced therein a polymer chain and/or a substituent.

19. The pressure-sensitive adhesive sheet according to any of claims 1 to 5, wherein the linear-chain molecule of said polyrotaxane is at least one selected from the group consisting of polyethylene glycol, polypropylene glycol, polyisoprene, polyisobutylene, polybutadiene, polytetrahydrofuran, polyacrylates, polydimethylsiloxane, polyethylene and polypropylene.

20. The pressure-sensitive adhesive sheet according to any of claims 1 to 5, wherein the number-average molecular weight of the linear-chain molecule of said polyrotaxane is 3,000 to 300,000.

21. The pressure-sensitive adhesive sheet according to any of claims 1 to 5, wherein the blocking groups of said polyrotaxane are at least one selected from the group consisting of dinitrophenyl groups, cyclodextrins, adamantane groups, trityl groups, fluoresceins, pyrenes and anthracenes.

22. The pressure-sensitive adhesive sheet according to any of claims 1 to 5, wherein the block groups of said polyrotaxane are a main chain or side chain of a polymer having a number-average molecular weight of 1,000 to 1,000,000.

23. The pressure-sensitive adhesive sheet according to any of claims 1 to 5, wherein the cyclic molecules of said polyrotaxane are α-cyclodextrin, the linear-chain molecule of said polyrotaxane is polyethylene glycol, and the blocking groups of said polyrotaxane are adamantane groups.

24. The pressure-sensitive adhesive sheet according to any of claims 1 to 5, wherein the gel fraction of the pressure-sensitive adhesive layer is not less than 70%.

25. The pressure-sensitive adhesive sheet according to any of claims 1 to 5, wherein the amount of the polyrotaxane (A) in the pressure-sensitive adhesive composition is 1 to 50 parts by weight.

26. The pressure-sensitive adhesive sheet according to any of claims 6 to 15, wherein said cyclic molecules of said polyrotaxane is at least one selected from the group consisting of a cyclic polyether, a cyclic polyester, a cyclic polyether amine and a cyclic polyamine.

27. The pressure-sensitive adhesive sheet according to any of claims 6 to 10, wherein the linear-chain molecule of said polyrotaxane is at least one selected from the group consisting of polyethylene glycol, polypropylene glycol, polyisoprene, polyisobutylene, polybutadiene, polytetrahydrofuran, polyacrylates, polydimethylsiloxane, polyethylene and polypropylene.

* * * * *